UNITED STATES PATENT OFFICE.

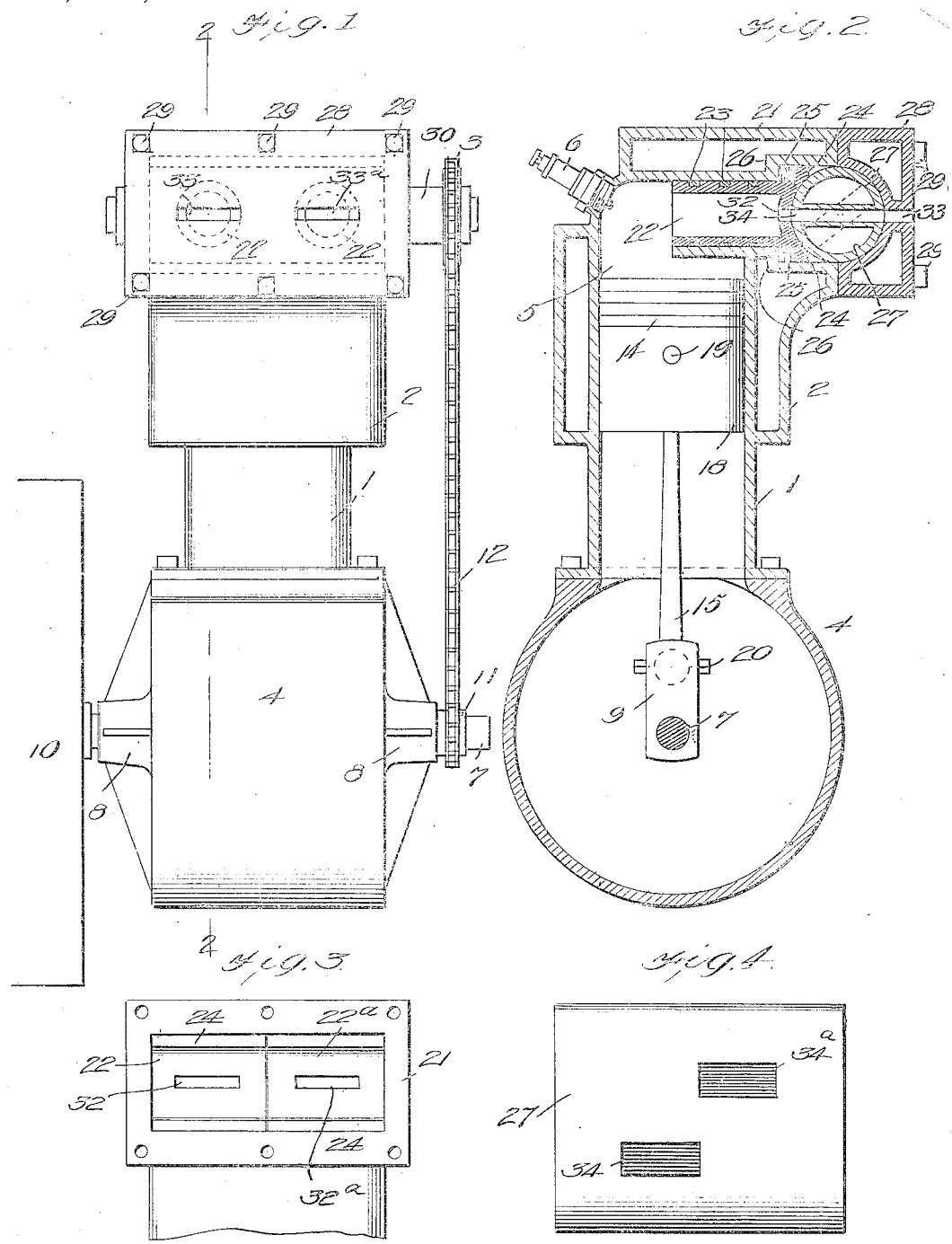

FRED D. CALKINS AND ALFRED C. JOHNSON, OF SUNNYVALE, CALIFORNIA.

INTERNAL-COMBUSTION ENGINE.

1,156,663.   Specification of Letters Patent.   Patented Oct. 12, 1915.

Application filed May 8, 1912. Serial No. 695,848.

*To all whom it may concern:*

Be it known that we, FRED D. CALKINS and ALFRED C. JOHNSON, citizens of Sunnyvale, in the county of Santa Clara and State of California, have invented certain new and useful Improvements in Internal-Combustion Engines, of which the following is a specification.

This invention is an improvement in internal combustion engines, and has for its object, the provision of simple, inexpensive means for controlling the admission and exhaust of the motive fluid, wherein a continuously rotating valve having a large bearing surface is provided, separated from the explosion chamber, and arranged to automatically compensate for wear.

In the drawings: Figure 1 is a front elevation; Fig. 2 is a section on the line 2—2 of Fig. 1; Fig. 3 is a front view of the upper part of the engine with the outer bearing section and the valve removed; and, Fig. 4 is a front elevation of the valve.

In the present embodiment of the invention, the cylinder 1 is jacketed at its outer or upper end as shown at 2, and is connected at its lower end to the crank case 4. A crank shaft 7 is journaled in bearings 8 in the crank case, and is extended at both ends beyond the case. The shaft is provided with a pulley 10 at one of the extended ends, and at the other with a sprocket wheel 11, connected by a chain 12, with a sprocket wheel 3, on the valve to be described.

The cylinder is extended at its outer or upper end to form an explosion chamber 5, and a spark plug 6 of ordinary form is threaded into an opening in the said chamber. A piston 18 is slidable in the cylinder, and the piston is provided with the usual packing rings 14 and is connected to the crank 9 of the crank shaft by a piston rod 15.

The rod engages a transverse pin 19 on the piston, and has a sectional bearing 20 at the other end for engaging the crank. The cylinder is extended at one side of the explosion chamber, as shown at 21, to form a casing having a pair of parallel cylindrical passages, for receiving cylindrical shells 22 and 22ª, each of which is slidable in the passage, and is provided with external annular grooves for receiving packing rings 23, to make a tight joint between the shell and the passage.

The outer end of each shell is rectangular in outline and is flanged laterally at the top and bottom as shown at 24, each flange forming an annular stop at the outer end of the shell, and springs 25 are arranged between each of the said stops and an annular shoulder 26 at the outer end of the passage, said shoulders being formed by enlarging the passage annularly.

The outer ends of the shells 22—22ª and the outer end of the extension in which the passages are formed are concave transversely, to form one section of a cylindrical valve chamber or bearing, for a cylindrical valve 27, which fits in the said bearing or chamber, and rotates on the face thereof. The outer section 28 of the chamber or bearing is secured to the extension by cap screws 29, and the inner face of the section is concave transversely to coöperate with the inner section to form a cylindrical chamber. The said valve 27 is extended beyond the chamber at one end, as shown at 30, and the said end is provided with the sprocket wheel 3, for engagement by the chain 12 to rotate the valve. The outer end of each shell 22—22ª is partially closed to form a port 32 and 32ª respectively, and the outer section 28 of the chamber or bearing has ports 33 and 33ª, in alinement with the respective ports 32 and 32ª. The valve 27 is provided with a transverse diametric passage near each end, one of which, 34, is adapted to connect ports 32 and 33, while the other 34ª is adapted to connect ports 32ª and 33ª. Each passage will connect the two ports twice during each rotation of the valve. The passages 34—34ª are arranged at an angle to each other, the former passage transmitting the exhaust and the latter transmitting the charge.

Any preferred form of mixing device or carbureter may be used for supplying the charge to the cylinder, and the spark plug may be controlled by any usual or suitable mechanism. The springs 25 force the shells toward the valve, and insures a fluid tight joint, whatever the position of the valve.

The valve being cylindrical, and being practically all bearing surface will wear equally and uniformly, so that no grinding of the valve on its seat will ever be required. The springs 25 will also automatically compensate for wear. The valve is also separated to a considerable degree from the products of combustion.

In operation, the valve is rotated continuously from the crank shaft, and twice during each rotation, ports 32 and 33 and ports 32$^a$ and 33$^a$ will be connected by passages 34 and 34$^a$, to permit the escape of exhaust products, and to permit the piston to draw in a new charge. The ports 32 and 33 are first connected to exhaust the waste products and then the ports 32$^a$ and 33$^a$ to admit a new charge. The charge is drawn in as the piston moves downwardly, and on the return stroke the charge is compressed and is ignited as the piston begins its forward stroke. The piston is driven forward by the expanding gases, and on its return stroke again drives out the exhaust products. The valve cannot become heated easily, on account of its distance from the explosion, and cannot bind, on account of the springs 25. The passages 34 and 34$^a$ are arranged at the proper angle with respect to each other to admit the charge and let out the exhaust at the proper time for the best results, and the connection between the crank shaft and the valve is arranged to rotate the valve at the proper relative speed. It will be noted that the outer ends of the ports 33 and 33$^a$ are not at the same level. The port 33$^a$ inclines upwardly from its inner end to its outer end, as will be evident from an inspection of Fig. 1.

We claim:

1. An engine of the character specified, comprising a cylinder provided at one end with an explosion chamber having a lateral extension, said extension having tubular passages at substantially a right angle to the axis of the cylinder, a shell in each passage, the outer ends of the shells being concave transversely to form an inner bearing section for the valve, an outer bearing section connected to the extension and coöperating with the outer ends of the shells to form a substantially cylindrical valve chamber, a valve in the chamber, the shells and the outer section having ports in alinement and the valve having ports for connecting the first-named ports, and springs pressing the shells toward the outer section to compensate for wear and to prevent leakage when the ports are in register.

2. An engine of the character specified, comprising a cylinder having at one end an explosion chamber, said chamber having a lateral extension provided with passages at approximately a right angle to the axis of the cylinder, an outer valve chamber section secured to the extension, a valve in the chamber, a shell in each passage, the outer ends of the shells being shaped to fit the valves, and yielding means for pressing the shells toward the valve to prevent leakage between the valve and the chamber and to compensate for wear.

FRED D. CALKINS.
ALFRED C. JOHNSON.

Witnesses:
EUGENE F. MORRIS,
D. W. BURNETT.